May 12, 1936.  H. H. McKEE  2,040,149
METHOD OF BRANDING LAMB AND THE LIKE

Original Filed April 12, 1930

Harry H. McKee
INVENTOR

BY

ATTORNEY

WITNESS

Patented May 12, 1936

2,040,149

UNITED STATES PATENT OFFICE 2,040,149

METHOD OF BRANDING LAMB AND THE LIKE

Harry H. McKee, Chicago, Ill., assignor to Swift and Company, Chicago, Ill., a corporation of Illinois Original application April 12, 1930, Serial No. 443,765. Divided and this application July 31, 1931, Serial No. 554,197

3 Claims. (Cl. 101—32)

This invention relates to the meat branding art and especially to methods for subsurface pigmentation exemplified by applicant's copending applications, Serial No. 208,668, filed July 27, 1927, and Serial No. 289,292, filed June 29, 1928, and particularly as applied to those meats such as lamb which have a tough parchment-like surface membrane of fine texture known as fell.

The present application is a division of applicant's co-pending application entitled Improvement in method and means for marking meat, Serial No. 443,765, filed April 12, 1930.

When plain needles are used for subsurface pigmentation or tattoo branding of such meats or carcasses, the membrane to which reference has been made tends to effectually wipe off and remove the ink from the points of the needles as they enter the surface of the meat, thus tending to exclude the pigment and prevent effective marking; consequently, the subsequent removal of the membrane or fell, taking with it as it does all pigment adhering to the fell, the carcass, or carcass part with the fell removed after branding, would not ordinarily have a legible brand.

One of the objects of this invention is to provide a method for positively effecting a proper and sufficient subsurface branding of lamb carcasses, or portions thereof, and the like, and to assure a permanent mark which shall be clearly legible even after the skin, membrane or fell is subsequently removed.

A device which may be used in carrying out the present method is described in my copending application Serial No. 554,610, filed August 3, 1931.

The present invention is not applicable to live animals and is concerned primarily with fell-covered carcasses such as lamb, from which the pelt has been removed. It is essential to the practice of the present method that the carcass have a membrane covering such as fell which may or may not be removed subsequent to branding.

Referring now to the accompanying drawing, in which.

Figure 7:
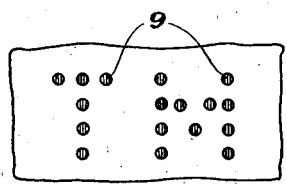

Figure 7 represents a dot-formed brand, as applied to the surface of a piece of meat The device shown in the drawing as adapted to the practice of the present method is shown by way of illustration and not by way of limitation. The form of the needle 1, shown as being used in the drawing, is provided with a longitudinal surface groove 2, extending from adjacent to the tip well back and at least somewhat beyond the depth of penetration required for branding.

Figure 1:
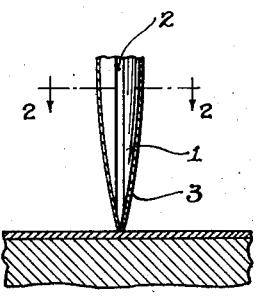
Figure 1 is a greatly enlarged or magnified fragmentary view showing the longitudinal slotted tip part of a needle wet with ink and presented to the fell-covered surface of a piece of meat, the meat and ink film being shown in section.
Figure 2:
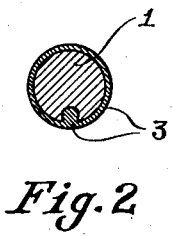
Figure 2 is a cross section on the line 2—2 of Figure 1 and shows the coating of ink which also fills the slot.
Figure 3:
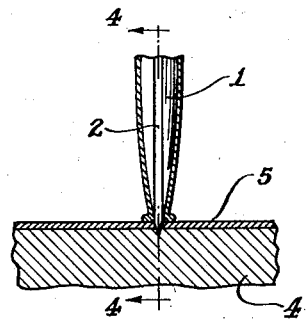
Figure 3 is similar to Figure 2, but shows the tip end of the needle projecting slightly into the meat, the ink being swept clean from the unslotted portion of the surface thereof by the fell.

In Figures 1 and 2, the needle is shown as coated with a layer or film 3 of ink. In Figure 3, the ink is being swept off from the point of the needle at the surface of the meat 4 by the fell 5.

Figure 4:
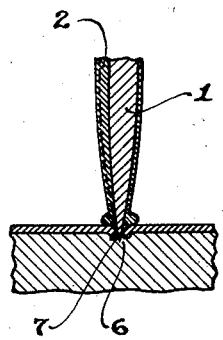
Figure 4 is similar to Figure 3, except that it represents a section on the line 4—4 of Figure 3, and the needle being somewhat further advanced, with the leading end of the groove extending slightly through the fell.
Figure 5:
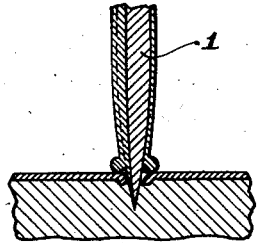
Figure 5 is similar to Figure 4, except that the needle has advanced far enough to introduce a sufficient charge of ink in its groove beneath the fell.

In Figure 4, the groove 2 may be seen just entering through the fell, as at 6, and carrying with it an ink charge 7 for depositing under the fell. The operation is shown somewhat more advanced in Figure 5.

Figure 6:
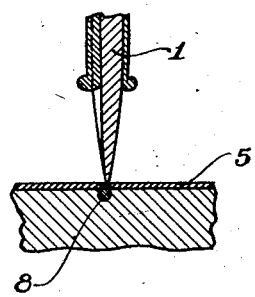
Figure 6 is similar to Figure 5 except that the needle is shown withdrawn, leaving beneath the fell a charge of ink deposited from the needle groove, the tip of the needle including the lower end of the groove here being shown substantially free of ink.

In Figure 6, the needle is shown withdrawn, leaving a locally concentrated sufficient charge of ink at 8 beneath the translucent fell 5, to present the appearance of a dot, such as indicated at 9 in Figure 7, and so positively mark the meat.

It may be noted that in the practice of this invention the method used for applying the brand by whatever means is mainly to form a dot or preferably an agroupment or series of dots by injecting and depositing appropriate charges of ink beneath the surface of the meat or under the fell thereon, according to the chosen design. The ink should preferably be fat solvent.

I claim:

1. In the packing industry, the method of marking edible carcasses or parts thereof, having a surface covering such as fell or the like, which consists in positively injecting pigment beneath the surface covering of fell in dotted arrangement according to a chosen design of brand.

2. In the packing industry, the method of marking edible carcasses or parts thereof, having a surface covering such as fell or the like, which consists in perforating the surface covering of fell by means of an inked implement having penetrating portions with ink pockets formed in the sides thereof and depositing ink from said ink pockets in the tissue beneath the fell.

3. In the packing industry, the method of marking edible carcasses or parts thereof, having a surface covering such as fell or the like, which consists in perforating the surface covering of fell by means of an inked implement having penetrating portions with longitudinally disposed ink pockets formed in the sides thereof and depositing ink from said ink pockets in the tissue beneath the fell.

HARRY H. McKEE.